US011480945B2

(12) United States Patent
Mohammad et al.

(10) Patent No.: US 11,480,945 B2
(45) Date of Patent: Oct. 25, 2022

(54) PRODUCTION DEVICE FOR PRODUCTION OF AN OBJECT FOR USER PERMITTED TO PRINT PRE-DEFINED NUMBER OF COPIES OF THE OBJECT INCLUDING ENCRYPTED TOKEN, AND DECRYPTED BY THE PRODUCTION DEVICE FOR DETERMINING USER ACCESS RIGHT

(71) Applicant: Hewlett-Packard Development Company, L.P., Spring, TX (US)

(72) Inventors: Nassir Mohammad, Bristol (GB); Helen Balinsky, Bristol (GB)

(73) Assignee: Hewlett-Packard Development Company, L.P., Spring, TX (US)

(*) Notice: Subject to any disclaimer, the term of this patent is extended or adjusted under 35 U.S.C. 154(b) by 451 days.

(21) Appl. No.: 16/500,068

(22) PCT Filed: Apr. 27, 2017

(86) PCT No.: PCT/US2017/029927
§ 371 (c)(1),
(2) Date: Oct. 1, 2019

(87) PCT Pub. No.: WO2018/199965
PCT Pub. Date: Nov. 1, 2018

(65) Prior Publication Data
US 2021/0103270 A1 Apr. 8, 2021

(51) Int. Cl.
*H04L 9/08* (2006.01)
*G05B 19/4155* (2006.01)
(Continued)

(52) U.S. Cl.
CPC ....... *G05B 19/4155* (2013.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS 7,248,693 B1 * 7/2007 Tretter .................. H04L 9/3234 380/278
8,245,306 B2 8/2012 Gimenez
(Continued)

OTHER PUBLICATIONS

Total Control Document Rights Management (DRM), Jan. 18, 2009, Available on the Internet at: < http://www.artistscope.com/news/2009-01-18.asp >.

*Primary Examiner* — Haris Sabah
(74) *Attorney, Agent, or Firm* — HP Inc. Patent Department

(57) ABSTRACT

A method tor regulating production of an object, the method comprising allocating access rights and a production quota to a user, the production quota to be fulfilled on an authorised production device using an encrypted unique job token embedded or comprised within or derived from the object and associated with the user and production device, receiving a user request to produce the object at the authorised production device, authenticating the user, decrypting the encrypted unique job token using a private key of the user and a private key of the production device, determining whether the production quota for the user related to the object has been met and on the basis of the determination, authorising the user request to produce the object at the authorised production device.

10 Claims, 6 Drawing Sheets

(51) Int. Cl.
*G06F 21/60* (2013.01)
*G06F 3/12* (2006.01)
*H04N 1/00* (2006.01)

(52) U.S. Cl.
CPC ............ *G06F 21/608* (2013.01); *H04L 9/088* (2013.01); *G05B 2219/49023* (2013.01); *G06F 2221/2141* (2013.01); *H04N 1/00238* (2013.01)

(56) References Cited

U.S. PATENT DOCUMENTS

| | | | | |
|---|---|---|---|---|
| 8,873,089 | B2 | 10/2014 | Uchida | |
| 8,976,384 | B1 * | 3/2015 | Marquardt | G06K 15/4095<br>358/1.14 |
| 2002/0054334 | A1 * | 5/2002 | Harrison | H04N 1/4413<br>358/1.15 |
| 2005/0268089 | A1 * | 12/2005 | Kim | G06F 21/608<br>713/153 |
| 2009/0284785 | A1 * | 11/2009 | Bando | G06F 21/608<br>358/1.15 |
| 2013/0235412 | A1 | 9/2013 | Baldwin | |
| 2014/0189351 | A1 * | 7/2014 | Steely | G06F 21/608<br>713/168 |
| 2015/0253761 | A1 | 9/2015 | Nelson | |
| 2016/0132276 | A1 | 5/2016 | Eda | |
| 2016/0219173 | A1 | 7/2016 | Kawai | |
| 2018/0076952 | A1 * | 3/2018 | Kono | H04L 9/3226 |

* cited by examiner

PRODUCTION DEVICE FOR PRODUCTION OF AN OBJECT FOR USER PERMITTED TO PRINT PRE-DEFINED NUMBER OF COPIES OF THE OBJECT INCLUDING ENCRYPTED TOKEN, AND DECRYPTED BY THE PRODUCTION DEVICE FOR DETERMINING USER ACCESS RIGHT

BACKGROUND

An object, which can be a document (2D print case) or an article (3D print case), may comprise sensitive or protected information and may be composed of the actual object, such as a document, which may be encrypted, and a job ticket that may contain a decryption key and a print policy for the object. The key for decrypting the protected object can thus be contained in a separable job ticket structure and once a secure encrypted object is created, a policy enforcer (who may or may not be a different person to the document creator) can decrypt the encrypted secure object and view the contents. The secure or protected object may be printed when a print device communicates with the policy enforcer, is given the decryption key by the policy enforcer and decrypts the object using the decryption key by processing the encrypted object.

BRIEF DESCRIPTION OF THE DRAWINGS

Various features of certain examples will be apparent from the detailed description which follows, taken in conjunction with the accompanying drawings, which together illustrate, by way of example only, a number of features, and wherein.

DETAILED DESCRIPTION

Figure 1:
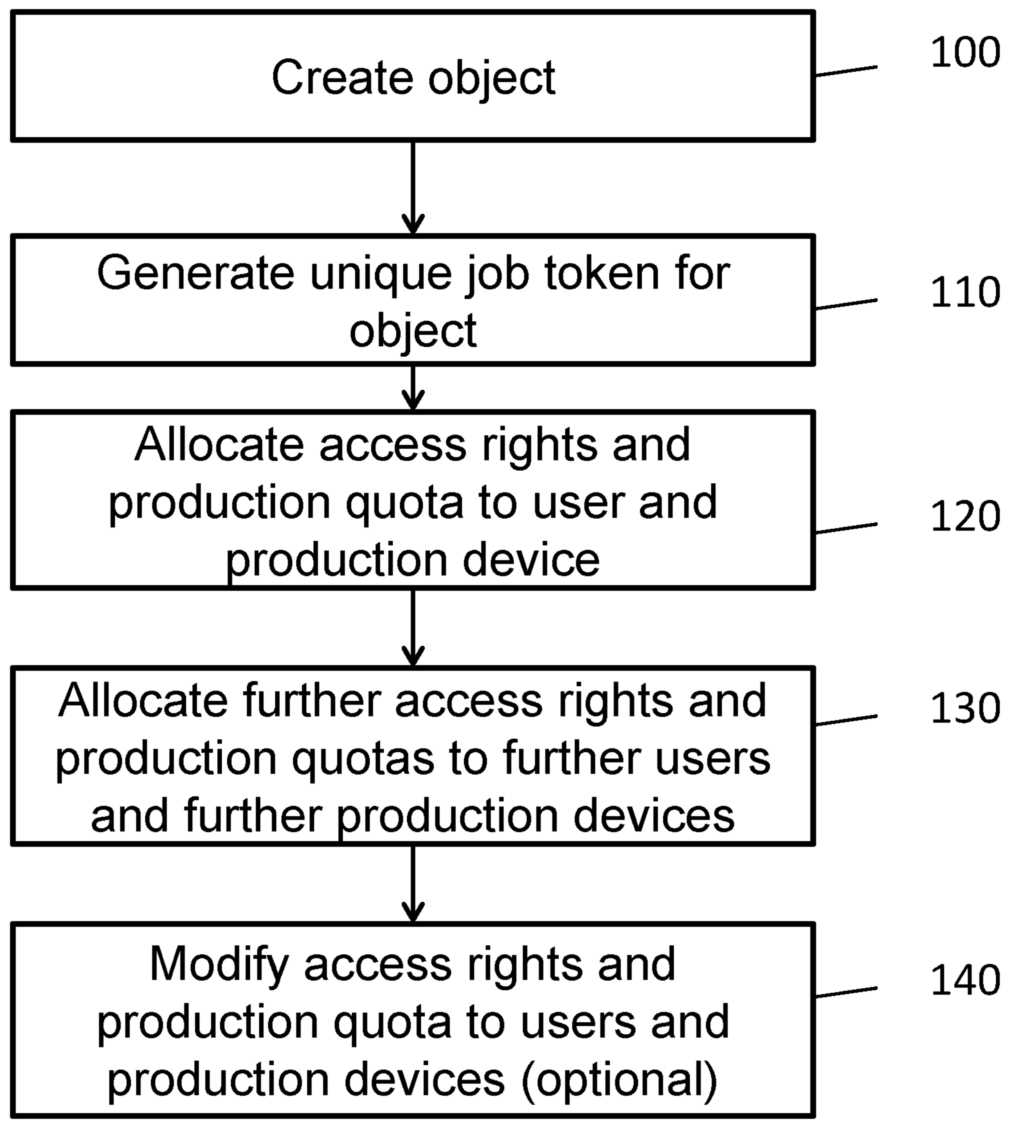
FIG. 1 shows a method for creating a secure object according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

A secure object may relate to a secure document or article, such as a two-dimensional document or a three-dimensional article for example. Production or print control of two-dimensional (2D) printing and/or three-dimensional (3D) printing is described according to examples.

In sensitive (secure) environments a user may be limited in the number of objects they are permitted to produce or print and any produced or printed objects may have to be surrendered upon leaving the premises for example.

According to an example, there is provided a method for sensitive secure job accountability that can be enforced on a cluster of production devices using a cloud based quota/allocation service. The production devices can be printers used to produce 2D or 3D printed objects for example.

The methods described are applicable to any content owner that needs to exercise control over the amount of sensitive or premium material being produced by an individual, unit or organization, based on a) access granted to each individual, b) quantity allocated to/purchased by that individual or group. In premium contents scenarios, a content owner can prevent further production after a specified number of copies of an object have been produced.

In an example, an object can be in the form of a composite document that has multiple users, respective ones of which may have different document component access rights. For example, each user may only be permitted or authorised to print a pre-defined number of copies of the document or a component thereof.

In an example, a composite document may relate to a design bundle for a 3D object to be printed using a 3D printer. For example, one component may be a design file and other components may relate to design geometry, powder, binding agent, detailing agent, surface colour, pattern, finishing and so on, unique object identifier(s) or token(s), manufacturing license (e.g. access key and number of copies). The document may be a publicly posted composite document (PPCD) that may be enabled for print control (PPCD-PC) as to the number of copies a given user can print.

According to an example, a creator or owner can allocate production control to workflow participants Production control can relate to component access rights and production quotas, and a right to produce an object can include a right to "manufacture" a three-dimensional article.

In an example, two types of workflow participant may exist: (i) a user of the secure object, and (it) a production device that is authorised to produce the object (2D or 3D article). Each type of workflow participant can be given access to a secure object by the creator. For the first type of workflow participant, the workflow participant user (WP-user) is a user of a secure object who is given access to some set of content-parts of the object by the creator at an authorised production device, and who may wish to produce their quota of the object. For the second type of workflow participant, the workflow participant device (WP-device) is a physical production device authorised as a workflow participant by a creator and upon which quota controlled object production can be fulfilled.

According to an example, production control can be allocated to a workflow participant using a unique Job identification (ID) or unique Job token that can be bound or linked to or associated with the object by virtue of its generation using elements of the object itself. The unique Job token can be provided in the object as a signed and encrypted field or as an additional part of a secure object or document. For example, a unique random Job token can be created as an additional part of a secure document and stored inside the document as a content-parts table which can be signed and encrypted. In an example, the content-parts table can comprise a list of content or parts that form the composite document, and access rights to each of those parts for multiple users and authorised production devices.

In an example, a unique Job token can be encrypted and used to regulate access for each user at and through an authorised production device, such as a print (2D or 3D) device for example. A quota/allocation service can then control the number of times specified workflow participants can produce their version of the object.

In an example, each user can be provided with a personal key for decrypting the object. When a user makes a request to produce the object at an authorised production device, the user provides their key, which can be checked and authorised by a server in communication with the authorised production device. The key is then used to decrypt the unique Job token associated with the object. If the object is a 3D article to be printed using a three-dimensional printer, the key may be considered a manufacturing license with a set number of copies. The object may contain information about extra premium features which may be accessible separately using a different key or further/additional keys or extra licenses.

The user can request a number of produced objects and the server can use the decrypted unique Job token to verify the allocated production quota whereby to permit or deny the user's request.

FIG. 1 is a flow chart of a method for creating an object according to an example.

At block 100 an object creator or owner creates the object, which can be a composite document for example. The object can be created using a client based software application or using a cloud based service.

A secure object can include the content-parts table comprising details of the object. A user may digitally sign their part of the content-parts table within the object using an encrypted signature. In an example, each WP-user has a key-map file which contains access keys for the content-parts of the object. The key-map files can be encrypted and stored in an entry table of the object. The entry table is a separate table to the content-parts table, also within the object.

At block 110 the creator generates a unique Job token for the object. The unique Job token may be derived from elements of the object itself or generated randomly and later associated with the object.

When the unique Job token is derived from elements of the object itself, it can be computed by the creator taking each part signature from the content-parts table, hashing concatenated data (such as well-ordered fields taken from top-to-bottom) and the user signing the object or document with their private key (one that gives a deterministic output, e.g. RSA (public key cryptosystem)). In an example, the signatures of the content-parts table can be used to form the unique Job ID, since every object generated uses new random advanced encryption standard (AES) keys generated by the creator for encrypting each part. Thus, even an identical part in a different object will produce a different cipher-text, and hence a different signature. Accordingly, two generated objects or documents with the same content-parts, access rights and workflow participants will always have different Job ID's.

In an example, a unique Job token is associated or linked to an object and may be stored as an encrypted field inside a row of an entry-table. The entry table can contain all of the key-map files for the users and devices for the composite document. The unique Job token can be stored as an additional symmetric-key (encrypted field), so that an authorised production device (WP-devices) can read the unique Job token but no other workflow participants (WP-users) can. Hence, the unique Job token is accessible and communicable by the (trusted) WP-devices and not the WP-users in order to prevent display of which rows belong to a WP-device in the entry-table, the WP-users fields can also be populated with dummy encryptions of bytes.

When the unique Job token is generated randomly and associated with the object it can be a sufficiently long, randomly generated unique number. In an example, this unique Job token is not plain-text inside the secure object otherwise, for example, for two production jobs with different production quotas where the same user (and hence decryption key) has production access, the unique Job token can be swapped with another object thereby swapping the production quotas.

In order to bind the unique Job token to the secure object, the unique Job IDs can be signed (by the creator) and encrypted as an additional object part that is read-only accessible by the specified trusted WP-devices (through their key-map file in the entry table). This minimizes the surface of attacks as an attacker will be unable to learn and re-use valid unique Job IDs. This therefore prevents an attacker from inserting their own data as a unique Job token (since the content-parts are signed) and prevents swapping of valid signed and encrypted unique Job ID s since the part will not be decrypted correctly using the symmetric key in the WP-devices key-map file when verifying. In an example, a unique Job token content-part can be labelled by a suitable identifier or token used as the name of the content-part, e.g. "job-ID".

In an example, a unique Job token can be placed at a specified position in the content-parts table of an object as an encrypted and signed field like any other content-part. The selected position can be reserved for the unique Job ID and the unique Job token does not therefore have to be stored in the entry-table and WP-devices can be provided read-only access to these fields.

In either case, the contents of the unique Job token (e.g. the user's key and print quota) are kept confidential and unmodifiable to avoid it being copied in a digital form and thus fulfilled on other devices not supporting content control. Hence, WP-users will not have direct access to plain-text content-parts as jobs are associated with specified devices, i.e. WP-devices, which only have the ability to decrypt and produce a job in the presence of a workflow participant that provides their access/private key/information (a WP-user).

At blocks 120 and 130 the creator allocates or designates the individuals/users or groups that can produce or print the object. In an example, this can be achieved by allocating access rights and production quotas or print quotas to each user and authorised production device or authorised printing device. The creator can choose to give themselves access to the whole object and will thus always be able to view the full contents of the object. This may be useful in sensitive work environments where the content owner may wish to check the object contents and any associated logs stored within. The job contents, such as the decryption key and production quota are kept inaccessible (save the ability to produce) from a WP-user to avoid the object being copied in digital form and thus fulfilled on other production devices that do not support content control.

According to an example, a designated WP-device (in common with any other object WP-user) owns private and public encryption keys. The private key is securely stored with the WP-device firmware or hardware such mat it cannot be reached or retrieved without visibly damaging the WP-device Within the WP-device it may be accessible by a trusted application(s).

Designated production devices or printing devices can be added to a secure object workflow. However, unlike WP-user key-map files, the WP-devices key-map file does not contain access keys for the actual content-parts of the object.

However, if a unique Job token is placed as a content-part then the authorised production device can be given read-only access to this particular part Note however that the object contents are inaccessible without participation of one of the WP-users.

To regulate access to object contents by WP-users without WP-devices credentials, secondary encryption can be applied to the WP-users key-map files. In an example, WP-users key-map files can be further assigned a random nonce and the secondary encryption can be an XOR operation with the corresponding nonce. In other arrangements, stronger encryption might be deployed. The series of nonces can be placed as entries in the WP-devices key-map file as the corresponding pair: {The key-map name/reference $KM_i$, the corresponding nonce $N_i$}.

According to an example, ore role of a WP-device is to bind the specific secure object access to itself and to decrypt the WP-user's key-map file in the entry table of the secure object once a WP-user has authenticated themselves on the device. Note that several WP-devices can similarly have the secure object associated with themselves by each device being specified as a workflow participant by the creator. Thus, in an example, each WP-device also has their own key-map file in the entry table containing references to user key-map files and corresponding nonces, and a row in the entry-table.

In this way, the creator can control the production quota for several workflow participants who use the same object using the unique Job token and this allows the creator to specify which devices will be authorised production devices and be able to produce the object. For example, a printer that can print the object can be added as a special type of workflow participant. Thus, the creator can ensure that the object is printable on any number of printers within the system, i.e. a sub-selection of printers in the system.

At block 140 the creator or master may optionally modify the access rights and production quota allocated to the workflow participants at the time of object creation or a subsequent time.

Figure 2:
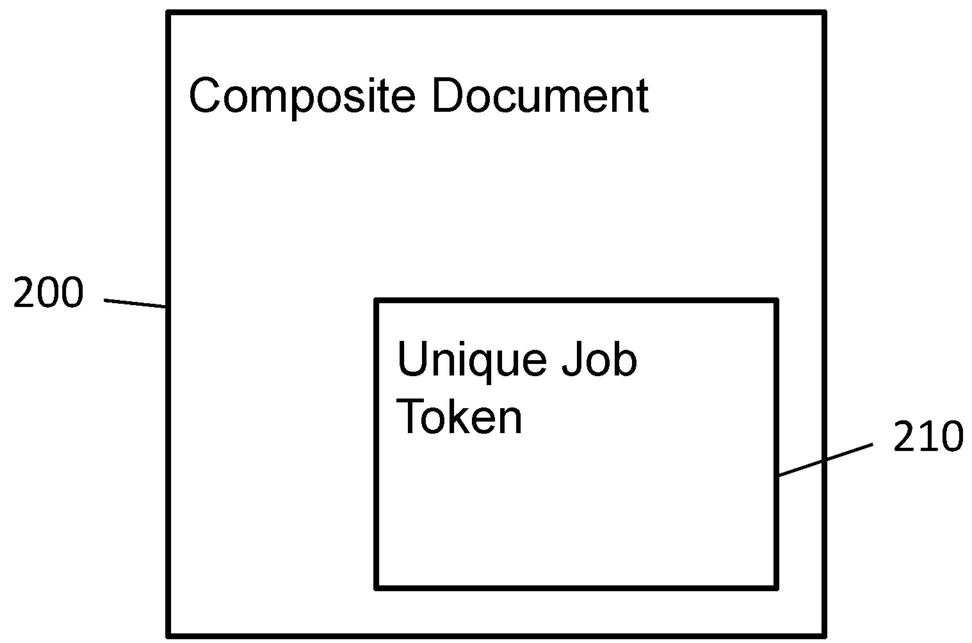
FIG. 2 is a schematic of a composite document according to an example.

FIG. 2 is a schematic representation of an object in the form of a composite document 200 having a unique Job token 210 according to an example. The composite document may be created as described above with reference to FIG. 1.

Figure 3:
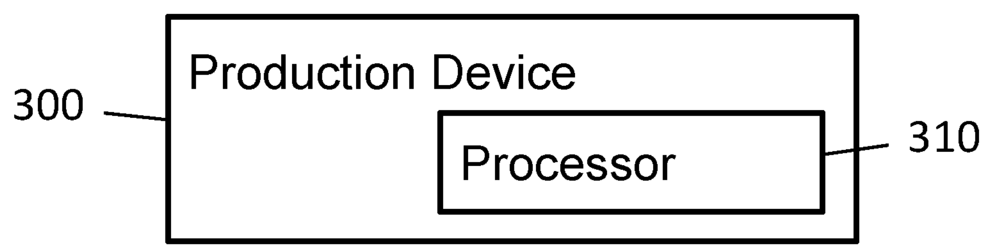
FIG. 3 is a schematic of a production device according to an example.

FIG. 3 is a schematic representation of a production device 300 comprising a processor 310 associated with a memory (not shown) according to an example. The memory comprises computer readable instructions which are executable by the processor 310. The production device may be a 2D or 3D printing device, for example.

Figure 4:
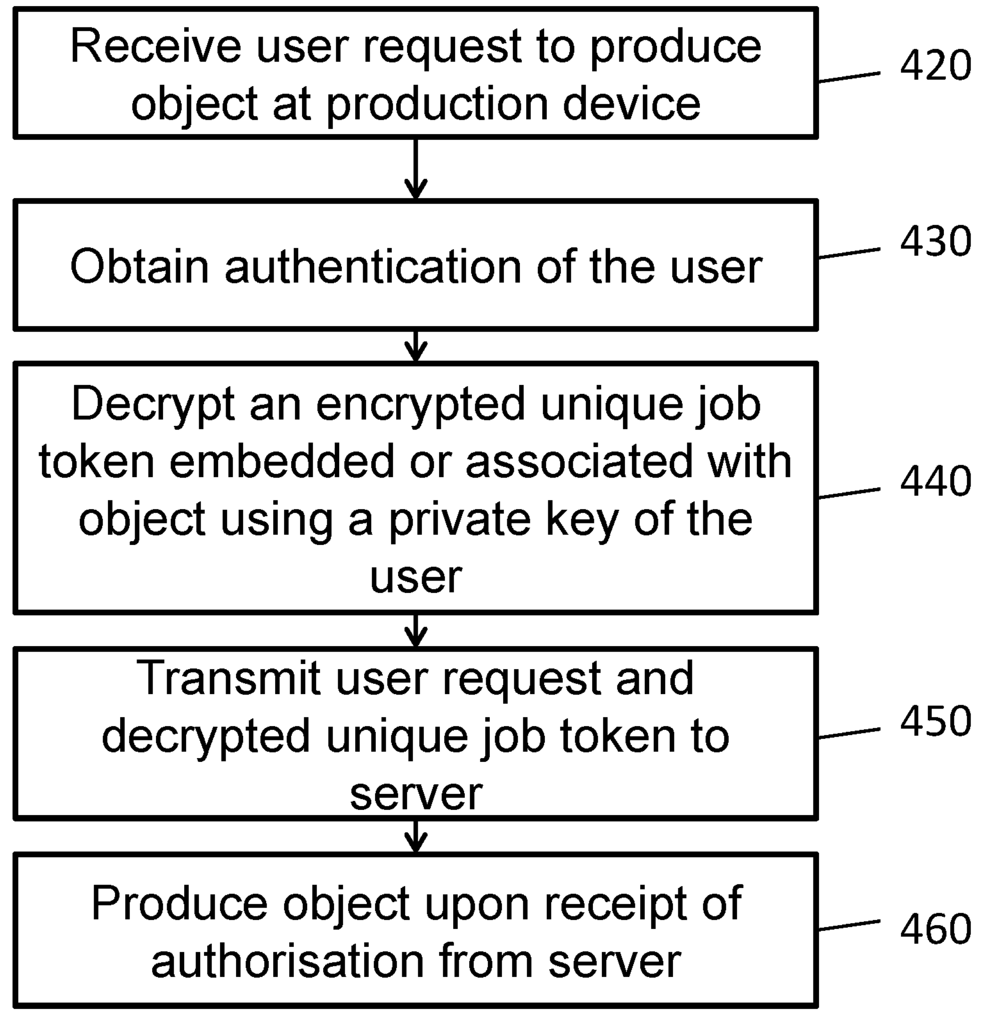
FIG. 4 is a method for producing a secure object according to an example.

FIG. 4 shows a method for producing or printing an object, which may be in the form of a document, at an authorised production or printing device (WP-device) according to an example.

At block 420 the WP-device receives a user's request to produce the secure object at the production device.

At block 430 the WP-device obtains authentication of the user, for example using the private key provided by user. The secure object is encrypted and the access control meta-data is carried within the object itself. Users access the sensitive information in the secure object using their private key.

At block 440 the WP-device decrypts the encrypted unique Job identifier or token embedded or composed within or derived from or associated with the secure object using the private key of the user. A user who is not designated as a workflow participant of the secure object by the creator cannot intercept or gain possession of the secure object and submit the legitimate version to an authorised device for production, since a valid private key is used for decryption at the authorised production device.

At block 450 the WP-device transmits the user request (e.g. the User ID, number of object copies and the verified Job ID/decrypted unique job token retrieved from the object using the user's private key to decrypt the unique job token) to a server, which may be an external or central server for example. The server matches (and hence verifies) the decrypted unique Job token and corresponding User ID against that stored in its database so as to authenticate the user request.

At block 460 the WP-device produces the object upon receipt of an authorisation from the server. The secure object may only be produced by the specified workflow participant, specified at object creation or subsequent object modification by the creator. Thus, the secure object may not be produced by anyone who simply sends the secure object to a production device or printer, or manages to intercept a decryption key that is capable of producing or printing, since the user must also provide their private key at the authorised production device.

Figure 5:
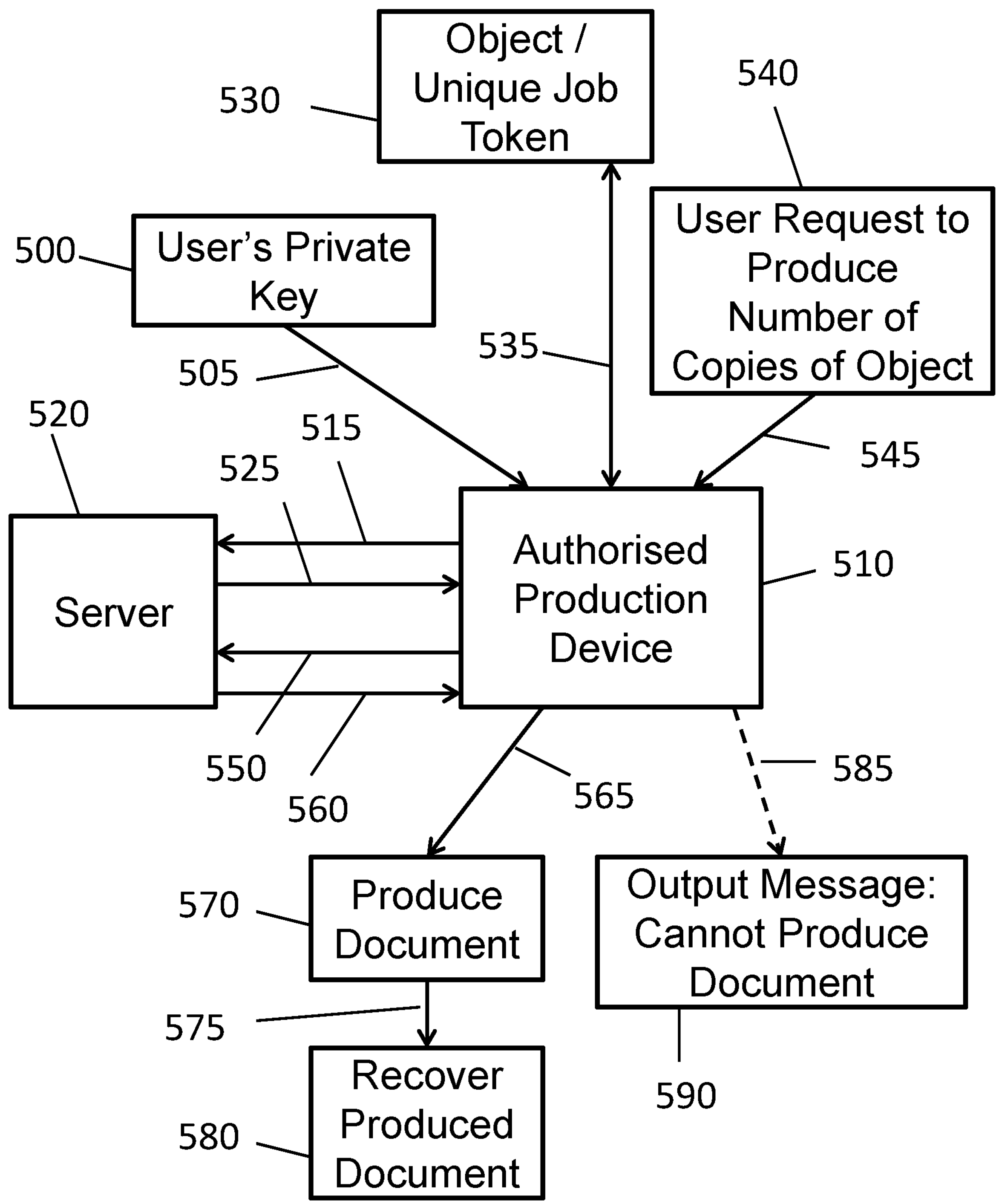
FIG. 5 is a schematic of a system for controlled production of a secure object according to an example.

FIG. 5 is a schematic representation of a system for controlled production of a secure object according to an example. It will be appreciated that the following is also applicable to the case of a secure object that can be in the form of bundle for printing of a 3D article. In the example of FIG. 5, the secure object can be sent to the authorised production device (WP-device) by the user (WP-user). The secure object is in a format such that the access rights travel with the object itself as an integral part and there is no need for additional encryption of the object as the format is already encrypted. For a user to submit a job to the WP-device, the WP-device is enabled to accept secure object jobs with a suitable format. WP-users engage their private key/information to access their accessible object content-parts at the WP-device, together with their username/password credentials (user ID).

As shown in FIG. 5, the system composes a private key 500 of a WP-user that is input 505 into an authorised production device 510. Once the authorised production device has received the users request to produce an object, the authorised production device obtains authentication of the user s private key by requesting authentication 515 from a server 520. The WP-device securely authenticates itself to a server and vice versa, (e.g. mutual authentication TLS). The WP-device and server exchange signed packets over encrypted channel (https) or packets are signed and encrypted. The server authenticates the user's private key and provides the authentication 525 to the authorised production device.

The unique job token 530 that is associated with the secure object is retrieved 535 by the authorised production device. The user requests to produce a set number of copies of the object 540 by inputting the request directly at the authorised production device 545. The authorised production device decrypts the encrypted unique Job token using the authenticated private key of the user. i.e. the Job token is verified and retrieved from the object, and combined with the retrieved User ID from the device control panel input, and the requested number of copies (r_i). Then the triplet {Job_ID, User_ID, r_i} is communicated to the server, where the authorised production device transmits the user request to produce a set number of copies of the object and the decrypted unique Job token to the server 550.

The server matches (and hence verifies) the Job token and corresponding User ID against that stored in its database.

The server retrieves the production quota or print quota allocated to the user using the decrypted unique Job token and determines whether the user has fulfilled the allocated production quota for the secure object. This is achieved by the server retrieving the remaining quota "C_i" for the corresponding Job token and User ID and comparing it with the requested amount of copies "r_i" to be produced, and computes the allowance "a_i". If the Job ID, User ID pair is not found, then a_i=0. Otherwise, a_i=min{C_i, r_i}. The server then decreases the current production quota C_i-a_i.

The server combines a_i with Job token and User ID into a triplet {Job_ID, User ID, a_i}, and ships the information back to the WP-device over the encrypted channel. If the user has a number of copies remaining, the server authorises the user request to produce the object and transmits authorisation 560 to the authorised production device to produce the secure object as per the user's request.

The WP-device checks if a_i>0, and then submits a_i copies of the workflow participants personalised object version to the production or printing pipeline. The authorised production device then produces 565 the secure object 570 which the user collects 575 and can later be recovered 580 should the user leave the secure premises or secure environment. If the user has expired the number of copies requested or if the quota would be exceeded, the server does not authorise 560 the user's request to produce the secure object. In this case, the authorised production device may output 585 a message 590 to the user that they are not permitted to or cannot produce the object.

In some deployments, in the case of print job failure, the WP-device may communicate the number of failed copies back to the server in exactly the same manner as above and the number of remaining copies can be increased accordingly.

The server 520, in one example, can contain a relational database (e.g. SQL) which contains a table of three columns, where each row contains the following information;

| Unique Job Token | User ID | Counter (C__i) |
|---|---|---|

The "counter C_i" records the number of times the specified WP-user can produce the specified secure object. In scenarios where a creator may wish to allow objects to be printed a set number of times across multiple production devices, a central quota (Local or Cloud) service can be enabled. The quota information retrieval is performed when a WP-user is at the WP-device and decides to produce a particular object.

In some examples the "user ID" may be a unique username that a WP-user signs in with (in addition to a password credential) on the WP-device against a Lightweight Directory Access Protocol (LDAP) server from which their private decryption key is fetched to the device and used to decrypt the object. In a general case, the user ID is from a shared resource where the creator can select and specify a unique User ID or password connected to the user.

In an example, the private key of the user who signs into the WP-device corresponds to the user ID input at the device. This prevents breaches in security in cases where a private key is to be provided locally, for example from a USB. Smart Card, etc. When the creator creates the object, he or she can encrypt the user ID using a symmetric key that is decrypted by the user's private key in the entry-table and place this in the user s row. Thus, when the user accesses the object the encrypted user ID field will be decrypted and can be compared against that input by the user to provide authentication Note that since the entry-table is signed by the creator, no unauthorised changes can be made to any of the fields. For example, if Alice and Bob both have print access to a document, and Alice knows Bob s username (and perhaps a corresponding pin code), Alice can sign in with Bob s username but provide her private key. Thus, when the WP-device communicates with the server it requests the print quota to be printed for Bob's username, but for Alice's version—Alice can then possibly print more copies of her version than originally specified. Therefore, the secure document is viewable only by an authorised user on a suitably enabled printing device's control panel screen because only the authorised user can decrypt the secure document on the printing device. Access to the secure document is thus available on a selected WP-device and not on any other device. Further, the access to the secure document on a WP-device is limited to the presence of a party with granted/purchased rights (either with knowledge of a secret password/PIN) or private key, i.e. a WP-user.

In the case where the unique Job token is generated randomly and later associated with the object, the unique Job token can be stored as an object part that is signed (by the creator) and then encrypted. Hence, its access and verification by a WP-device follows that of accessing any other object part by a workflow participant.

In the case where the unique Job token is derived from elements of the object itself, the content-parts table signature can be verified according to a secure document (or object) protocol (along with all other table signatures) to ensure that it has not been tampered with. The unique Job token can then be decrypted using a symmetric key recovered by the WP-device's private key. The unique Job token can be verified using the creator's public key certificate inside a master certificate table that can be stored inside the secure object. This can be used to 'de-crypt' the unique Job token using the public key and compare the result with the hash of the corresponding concatenation of part signatures. If verified, the WP-device can be confident that the creator or master has signed and identified the current object. Where the unique Job token is stored as a first content-part, and formed from the other content-parts, it can be verified and decrypted following standard secure document (or object) protocol as for any other content-part.

Figure 6A:
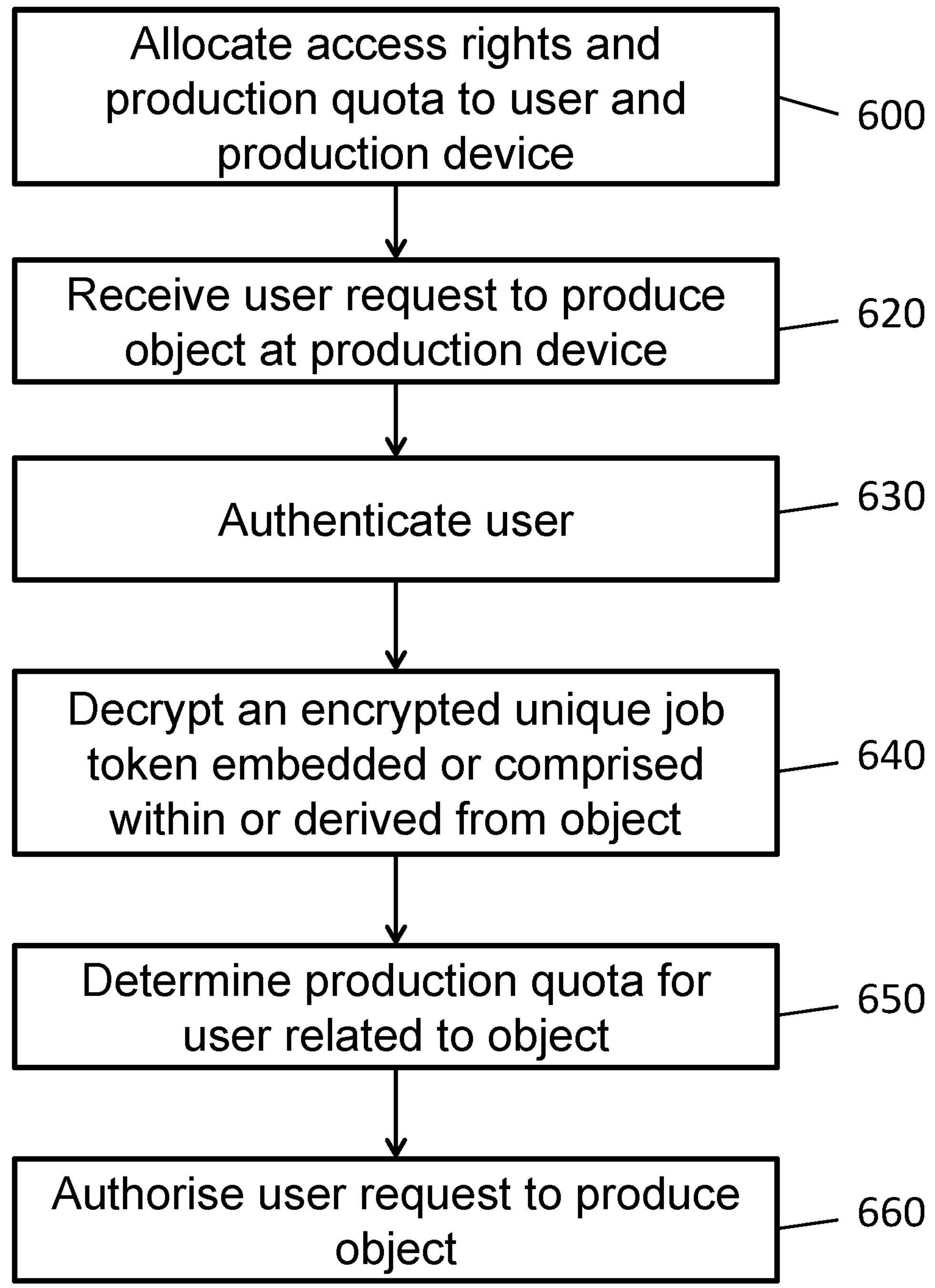
FIG. 6A shows a method of authorising a user request to produce an object according to an example.

FIG. 6A is a flowchart of a method of authorising a user request to produce an object according to an example. At block 600 the access rights and production quota are allocated to a user, to be fulfilled on an authorised production device. At block 620 the production device receives the user request to produce the object at the authorised production device. At block 630 the user is authenticated using their private key. At block 640 the encrypted unique Job token that is embedded or comprised within or derived from the secure object is decrypted using the private key. At block 650 the production quota for the user in relation to the secure object is determined. At block 660 the user's request to produce the object is authorised.

Figure 6B:
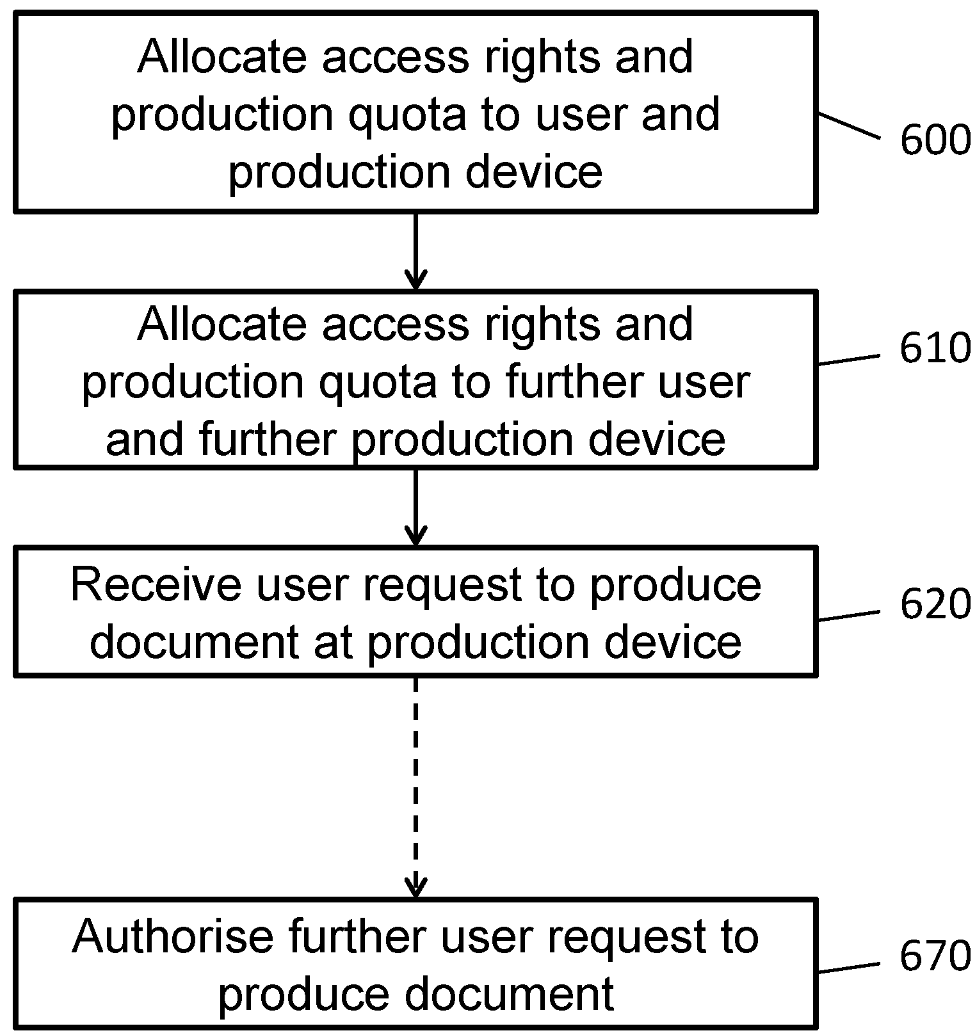
FIG. 6B shows a method of authorising multiple user requests to produce an object according to an example.

FIG. 6B is a flowchart of a method of authorising multiple user requests to produce an object and comprises the additional block 670 of authorising further user requests to produce the secure object according to an example.

According to an example, a firmware extension of the WP-device can perform the following to process a secure object for print submission after a WP-user selects a file and presses the print button:

1. Use the WP-device's own private key (e g through an existing embedded Application Programming Interface (API)) to access a selected print job as any other workflow participant.
2. Identify the correct row in the entry-Table following a standard secure document protocol.
3. Decrypt the WP-device's key-map file name. If the secure object is formatted such that the Job token is in the entry-table field also, then also decrypt and recover the Job token field.
4. If an entry is not found in the entry-Table, then STOP as the secure object is not associated with this device. A user interface (UI) message can be displayed to the user indicating that the object is not printable on this device. In cases where a creator or content owner may not even wish the secure object to disclose which devices it is printable on; a generic message may be displayed informing the current user that they cannot print this object. The unauthorised device cannot recover any object contents (which are encrypted) even in the presence of an authorised WP-user.
5. Verify object ID using signatures of the content-parts and the recovered Job token either from the entry-table or from the content-parts table.
6. Using WP-user's private key and following the same procedure as above, identify WP-user's key-map filename if it exists. If not, STOP.
7. WP-device's key-map file contains rows (and possibly one additional row for a content-part containing document ID), where each row is a pair of fields: {The key-map name/reference $KM_i$, the corresponding nonce $N_i$}, hence, find the row containing the identifier or token of participant's key-map name and read the corresponding nonce. If a row for key-map $KM_i$, cannot be found, then STOP. A UI message can be displayed to the WP-user indicating that they cannot print this object.
8. Retrieve the Counter $C_i$ for the particular Job token from the central "Quota Service" server (as described below) that holds information on the Job IDs printable at a device and by which particular users, and also (in one example) a counter counting down the remaining number of times $C_i$ the user can print the particular object.
9. Compare the number of requested "r" print copies with the counter "$C_i$". If $r<=C_i$ allow r copies to be printed. In one scenario, if $r<C_i$ allow $C_i$ copies to be printed, send a message to the Control Panel about insufficient number of allocated copies and that only $C_i$ may be printed. In some examples the WP-user might be asked to confirm that they want to print the remaining copies, in other examples this may be omitted. Either way, always allow for printing $\min\{C_i, r\}$.
10. Immediately decrease the counter $C_i$ in the central "Quota Service" (server) by the specified amount once the number of copies allowed to be printed is determined. Note that decreasing the counter C_i should be done before the signal that the objects have all been physically printed is received, as otherwise, a user can potentially (for example) turn off or disconnect the device after having partially printed the objects and not have their print counter C_i reduced.
11. Using the recovered nonce $N_i$ decrypt (XOR) the WP-users key-map file to recover the plain-text version.
12. From the point that the WP-user's key-map file is recovered, follow standard PPCD access protocol and verification procedure to recover the accessible unencrypted content-parts and submit to the printing pipe-line.
13. The WP-user may be prompted to print more copies of the object, informed of the number of remaining times the object can be printed, navigated to the screen showing list of available secure objects for printing, etc
14. The WP-user may not be able to print anymore, as indicated by the parameter C_i being reduced to 0.

As described herein, the distributed production of a secure object allows quota control on a device. That is, a user can produce at a device with an object stored on the device by simply providing their private key. They do not have to produce the object using a computer sending the protected object to the production device. In the differential printing case for example, multiple users can use a single printing device to print their version of the object the specified number of times, e g one copy of a personal payslip for each user.

In an example, each of the authorised users is present at an authorised device and able to input their private key to be able to produce the secure object. Hence, especially in sensitive content protection scenarios, an object may not be produced or printed accidentally and forgotten about, e.g. a user presses print on a device, which sends an authorised object to device printer, which then prints the object. The printed object may be left on the device in the network, and perhaps the user is unable to find it or has selected a wrong printer. The user may therefore print to the device they want to, but one copy of the object is now printed on another device somewhere.

Once an authorised device has the object encryption/decryption keys, the device has complete and unrestricted access to the object. However, the authorised device only has access in the presence of an authorised user physically located at the device following input of their private key, where the actual device access is restricted by their key map file, i.e. the device cannot access the object contents at any time, unless the user provides their private key to the device as well.

According to an example, there is therefore provided a mechanism to allow a content-owner to establish control and enforce limits over distribution of personalized copies containing sensitive (private, confidential, premium, etc.) material to be printed on a cluster of printing devices over a period of time. As noted above, the secure object format may also enable content-parts to hold, for example, blueprints so that the printed material may comprise of 30 printed objects on a suitably enabled 3D printing device following the same protocols, in addition to printing on paper mediums, or any other materials. It also allows content-owners to specify clusters of trusted printing devices that can print an object. Content owners are able to securely control the access and number of times possibly multiple users can differentially print a sensitive object by binding a secure object to a particular printing device or a duster of such authorised devices linked via a secure server, and requiring user credentials to gain access to the printable content-parts of a secure object.

According to an example, there is therefore provided a mechanism to enable production control for multiple users of the same object through integral and inseparable access control. The number of copies of premium or sensitive objects that can be produced can be controlled over a collection of production devices using a server to securely control the production quota of each individual producing a specified object. If specified, premium or sensitive jobs with enforced production control can be sent to a specific trusted production device so that the secure objects cannot be removed, copied or deleted from the designated device unless in the presence of an individual with granted access (who provides his credentials). Removing a production job from a group of authorised production devices may render the object inaccessible on any other production device which has not been specified by the premium or sensitive content owner upon creation or subsequent management. Accordingly, premium or sensitive content object can be distributed over insecure channels, making the object highly portable. Secure objects may easily be removed by authorized users from authorised production devices. This enables users to easily export partially produced jobs and to re-import them back into the specified device(s) for further processing. This allows users to handle multiple premium objects on an authorised production device that may have limited memory. Premium or sensitive content can therefore be transferred to a purchaser over insecure channels by the content owner, and premium or sensitive objects can be partially produced, removed to, e.g. USB, and re-submitted to the authorised device for producing later. This ability for objects to be exported and re-imported to a device(s) over insecure channels allows users to interchange different objects easily. This is beneficial as a device's memory is limited and user's may not be able to store all their objects in the device for producing at the same time.

Secure objects can be communicated over low security channels and may not be accessed without a workflow participant's private key, on a specified or authorised production device. Furthermore, quota information is stored at a secure server so cannot be changed. Object creators also specify which trusted devices are to form part of the workflow so attackers cannot separate the secure object from the specific cluster of authorised devices, and hence the quota from the server.

If an object is compromised, e.g. the signatures or Job token are not valid, then the device can discard the object. Furthermore, if the Job token is not found on the server during a communication for production, then the object can also be discarded (e.g. if an object is requested to be produced but which has been deleted/expired from the database or has zero quota available for every corresponding user ID).

A legitimate user of the PPCD-PC may start producing a set number of copies of an object and then disconnect/turn off the WP-device before the objects are fully produced. Thus, the WP-user may hold additional copies of partially produced versions by producing the object again. In this case, the counter in the server can always be decremented first and then the signal and allowed production quota communicated to the WP-device. There is no requirement to wait for production to finish before decrementing the quota in the server. It is noted that in cases where objects are only partially produced, for example where printing errors occur, the functionality can be extended so that the WP-device communicates with the server indicating the production failure, and thus the server can act accordingly, for example, increment the quota for future production.

According to an example, the unique Job token can be stored securely inside the object itself as an encrypted field in the device's entry-table row, and hence is only accessible to the designated and trusted devices. Alternatively, the unique Job token may be stored as an object part. Thus, an attacker will not have knowledge of the unique Job token and hence will not be able to change the production quota at the server for a particular workflow participant and job. Furthermore, any communication requires both the device and server to authenticate themselves to each other.

Examples in the present disclosure can be provided as methods, systems or machine readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus (e.g. the production device of FIG. 3) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor. For example, the method shown in FIG. 4 may be incorporated as computer readable instructions 420-460 that are executable by the processor 310. The instructions 420-460 comprise: Instruction 420 to receive a user's request to produce an object at an authorised production device. Instruction 430 to obtain authentication of a private key of the user: Instruction 440 to decrypt an encrypted unique Job Identifier or token embedded or associated with the object where the decryption is achieved using the private key of the user. Instruction 450 to transmit the user request and the decrypted object to a server; and Instruction 460 to produce the object upon receipt of the authorisation from the server.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for regulating production of an object, the method comprising:

allocating access rights and a production quota to a user, the production quota to be fulfilled on an authorised production device using an encrypted unique job token embedded or comprised within or derived from the object and associated with the user and the authorized production device, wherein the unique job token is generated using elements of the object itself such that the unique job token is inseparable from the object;

receiving a user request to produce the object at the authorised production device;

authenticating the user;

decrypting the encrypted unique job token using a private key of the user and a private key of the production device;

determining whether the production quota for the user related to the object has been met; and on the basis of the determination, authorising the user request to produce the object at the authorised production device.

2. The method as claimed in claim 1, wherein the step of decrypting is performed at the authorised production device.

3. The method as claimed in claim 1, wherein the step of authenticating and/or determining and/or authorising is performed at a server.

4. The method as claimed in claim 1, wherein the step of allocating is extended to multiple users and/or multiple authorised production devices.

5. The method as claimed in claim 1, wherein a creator of the object performs the step of allocating at a time of object creation or subsequent management of the object.

6. The method as claimed in claim 1, wherein the object is a composite document with multiple users having respective multiple access rights.

7. A production device for production of an object, the production device comprising:

a processor to:

receive a user request to produce the object at the production device;

obtain an authentication of the user;

decrypt an encrypted unique job token embedded or associated with the object using an authenticated private key of the user, wherein the unique job token is generated using elements of the object itself such that the job token is inseparable from the object;

transmit the user request and the decrypted unique job token to a server; and produce the object upon receipt from the server of an authorisation of the user request to produce the object at the authorised production device, based on a determination of whether a production quota for the user related to the object has been met.

8. The production device as claimed in claim 7, further comprising a memory for storing the object.

9. The production device as claimed in claim 7, wherein the production device is a three-dimensional printer.

10. A non-transitory machine-readable storage medium encoded with instructions for regulating production of an object, the instructions executable by a processor of a system to cause the system to:

allocate access rights and a production quota to a user, the production quota to be fulfilled on an authorised production device using an encrypted unique job token embedded or comprised within or derived from the object and associated with the user and the authorized production device, wherein the unique job token is generated using elements of the object itself such that the job token is inseparable from the object;

receive a user request to produce the object at the authorised production device;

authenticate the user;

decrypt the encrypted unique job token using a private key of the user and a private key of the production device;

determine whether the production quota for the user related to the object has been met; and on the basis of the determination, authorise the user request to produce the object at the authorised production device.

* * * * *